United States Patent [19]

Denzel et al.

[11] 3,855,675

[45] Dec. 24, 1974

[54] 1-(2-FURANYLMETHYL)-1H-PYRAZOLO(3,4-B)PYRIDINE-5-METHANONES

[75] Inventors: Theodor Denzel, Regensburg; Hans Hoehn, Tegernheim, both of Germany

[73] Assignee: E. R. Squibb & Sons Inc., Princeton, N.J.

[22] Filed: Apr. 22, 1974

[21] Appl. No.: 462,847

Related U.S. Application Data

[63] Continuation-in-part of Ser. No. 361,120, May 17, 1973, which is a continuation-in-part of Ser. No. 292,363, Sept. 26, 1972, which is a continuation-in-part of Ser. No. 146,812, May 25, 1971, abandoned.

[52] U.S. Cl....... 260/296 H, 260/240 J, 260/310 R, 424/263
[51] Int. Cl............................................. C07d 49/20
[58] Field of Search................................ 260/296 H

[56] References Cited
UNITED STATES PATENTS

| | | | |
|---|---|---|---|
| 3,250,769 | 5/1966 | Schmidt et al.................. | 260/247.1 |
| 3,403,158 | 9/1968 | Markillie........................ | 260/296 H |
| 3,542,793 | 11/1970 | Rossi et al. ..................... | 260/294.8 |
| 3,733,328 | 5/1973 | Hoehn et al. .................... | 260/293.6 |
| 3,736,327 | 5/1973 | Denzel et al.................... | 260/296 H |
| 3,787,430 | 1/1974 | Hoehn et al. .................... | 260/296 H |
| 3,810,905 | 5/1974 | Hoehn et al................. | 260/295.5 B |

FOREIGN PATENTS OR APPLICATIONS

| | | | |
|---|---|---|---|
| 2,225,433 | 12/1972 | Germany ....................... | 260/296 H |

*Primary Examiner*—John D. Randolph
*Attorney, Agent, or Firm*—Lawrence S. Levinson; Merle J. Smith

[57] ABSTRACT

New 1-(2-Furanylmethyl)-1H-pyrazolo[3,4-b]-pyridine-5-methanones are useful as anti-inflammatory agents.

14 Claims, No Drawings

1-(2-FURANYLMETHYL)-1H-PYRAZOLO(3,4-B)PYRIDINE-5-METHANONES

This application is a continuation-in-part of application Ser. No. 361,120, filed May 17, 1973, which is a continuation-in-part of application Serial No. 292,363, filed Sept. 26, 1972, which is in turn a continuation-in-part of application Serial No. 146,812, filed May 25, 1971, and now abandoned.

SUMMARY OF THE INVENTION

This invention relates to new 1-(2-furanylmethyl)-1H-pyrazolo[3,4-b]pyridine-5-methanones which have the formula (I)
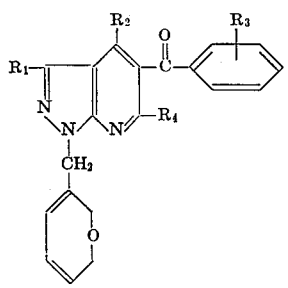

The symbols have the following meanings in formula I and throughout this specification. $R_1$ is hydrogen or lower alkyl, $R_2$ is halo, hydroxy, lower alkoxy, amino or lower alkylamino. $R_3$ is hydrogen, halo, lower alkyl or lower alkoxy. $R_4$ is hydrogen, lower alkyl or phenyl.

DETAILED DESCRIPTION OF THE INVENTION

In preceding applications, referred to above, compounds of the above formula have been described primarily as intermediates useful in the production of various pyrazolopyridines. It has now been found that compounds of formula I are also useful as anti-inflammatory agents as described below in more detail.

The lower alkyl groups in any of the foregoing radicals are straight or branched chain hydrocarbon groups of up to eight carbon atoms like methyl, ethyl, propyl, isopropyl, butyl, sec.-butyl, t-butyl and the like. The lowest four members are preferred, especially methyl and ethyl. All four halogens are included, but chlorine and bromine, especially the former, are preferred.

The products of the examples are representative of the various compounds of this invention and are preferred embodiments. Especially preferred compounds of formula I are those wherein $R_1$ is hydrogen or methyl, $R_2$ is hydroxy, lower alkoxy, especially ethoxy or amino, $R_3$ is hydrogen, chloro, methyl or methoxy (preferably in the p-position), and $R_4$ is hydrogen, methyl or phenyl especially hydrogen.

The new compounds of formula I are formed by the following series of reactions. The symbols in the structural formulas have the same meaning as previously described.

A 5-aminopyrazole of the formula (II)
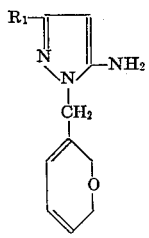

[produced by the procedure of British Pat. No. 1,057,740 or the procedure described in Z.f. Chemie 10, 386(1970)], is made to react with an alkoxymethylene benzoylacetic acid ester of the formula (III)
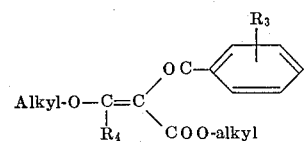

[produced by the procedure described in Org. Synth. 28, 60-2(1948)] by heating at a temperature of about 120°-130°C.

The resulting compound of the formula (IV)
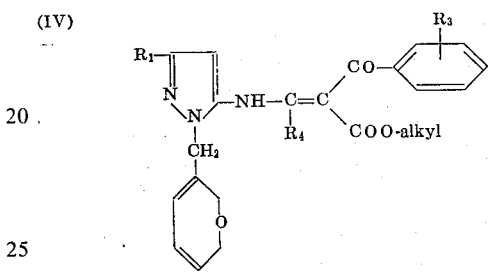

is cyclized in an inert organic solvent such as diphenyl ether at about 230° to about 260°C. while distilling off the alcohol formed, producing a compound of the formula (V)
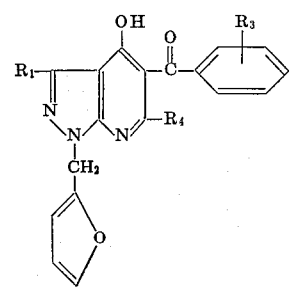

This 4-hydroxy compound is refluxed for several hours with a phosphorus halide like phosphorus oxychloride to obtain a compound of the formula (VI)
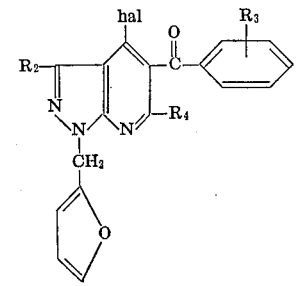

"Hal" represents halogen, preferably chlorine.

Treatment of the product of formula VI with ammonia or a lower alkylamine at ambient or elevated temperature, e.g., up to about 150°C., yields a product of formula I wherein $R_2$ is amino or lower alkylamino, respectively.

Treatment of a compound of formula V with an alkylating agent, e.g., an alkyl halide like ethyl iodide, yields a compound of formula I wherein $R_2$ is lower alkoxy, i.e., (VII)

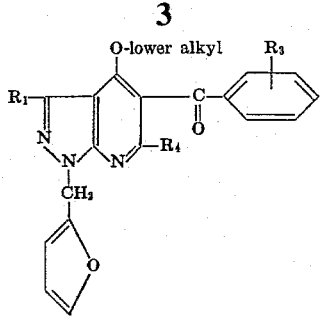

Treatment of the compound of formula VII with an amine as described above also yields a product of formula I wherein $R_2$ is lower alkylamino.

According to a modification of the foregoing procedure a 5-aminopyrazole of formula II is made to react with an acetoacetic acid ester derivative of the formula (VIII)

by heating in an organic solvent, e.g., at-reflux temperature, to obtain a compound of the formula (IX)

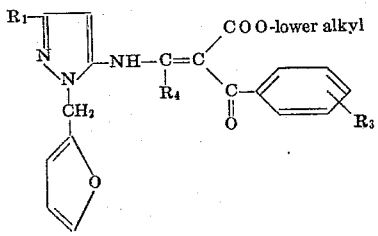

which is now cyclized as described above, producing compounds of formula V. This product is then treated with an agent such as sodium hydride and heated with a benzoyl halide of the formula (X)

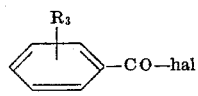

which produces a product of the formula (XI)

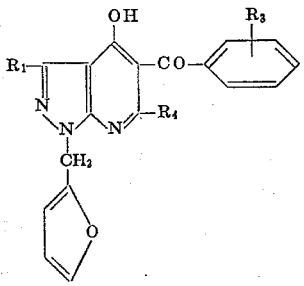

The new compounds of this invention have anti-inflammatory properties and are useful as anti-inflammatory agents, for example, to reduce local inflammatory conditions such as those of an edematous nature or resulting from proliferation of connective tissue in various mammalian species such as rats, rabbits, dogs and the like when given orally or parenterally in dosages of about 5 to 50 mg/kg/day, preferably 5 to 25 mg/kg/day, in single or 2 to 4 divided doses, as indicated by the Reversed Passive Arthus Reaction and by the carageenan edema assay in rabbits. The active substance may be utilized in compositions such as tablets, capsules, solutions or suspensions containing up to about 500 mg. per unit of dosage of a compound or mixture of compounds of formula I. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The following examples are illustrative of the invention and constitute preferred embodiments. Other members of the class are produced by appropriate substitution of the starting materials using these as models. All temperatures are in degrees celsius.

EXAMPLE 1

4-Ethoxy-1-(2-Furanylmethyl)-1H-Pyrazolo[3,4-b]Pyridine-5-phenylmethanone a.                    2-Benzoyl-3-[1-(2-furanylmethyl)-5-pyrazolylamino] crotonic acid, ethyl ester 163 g. of 1-(2-furanyl)methyl-5-aminopyrazole (1 mol.) and 248 g. of ethoxymethylene benzoyl acetic acid ethyl ester (1 mol.) are heated at 130° until no more alcohol distils off (approximately 1 hour). The oily residue crystallizes and yields on cooling and recrystallization from hexane 319 g. of 2-benzoyl-3-[1-(2-furanylmethyl)-5-pyrazolylamino]crotonic acid, ethyl ester (85%), 75–77°.

b.   4-Hydroxy-1-(2-furanylmethyl)-1H-pyrazolo[3,4-b]pyridine-5-phenylmethanone 31.9 g. of 2-Benzoyl-3-[1-(2-furanylmethyl)-5-pyrazolylamino]crotonic acid ethyl ester are dissolved in 50 ml. of diphenyl ether and refluxed at 260° for 30 minutes. Distillation of the solvent yields a dark oil, which crystallizes on addition of methanol. Recrystallization yields 20 g. of 4-hydroxy-1-(2-furanylmethyl)-1H-pyrazolo[3,4-b]pyridine-5-phenylmethanone (61%), m.p. 102°.

c.     4-Ethoxy-1-(2-furanylmethyl)-1H-pyrazolo[3,4-b]pyridine-5-phenylmethanone 3.3 g. of 4-hydroxy-1-(2-furanylmethyl)-1H-pyrazolo[3,4-b]pyridine-5-phenylmethanone (0.01 mol.) are dissolved in 20 ml. of dimethylformamide. 2.8 g. of potassium carbonate and 3.1 g. of ethyl iodide are added and the mixture is warmed for 12 hours at 60°. Excess potassium carbonate is filtered off and water is added. 4-Ethoxy-1-(2-furanylmethyl)-1H-pyrazolo[3,4-b]-pyridine-5-phenylmethanone precipitates and is recrystallized from hexane, yield 3 g. (86%), m.p. 70°.

EXAMPLE 2

4-Amino-1-(2-Furanylmethyl)-3-Methyl-1H-Pyrazolo[3,4-b]Pyridine-5-Phenylmethanone a.          2-Benzoyl-3-[1-(2-furanylmethyl)-3-methyl-5-pyrazolylamino]-crotonic acid, ethyl ester 177 g. of 5-amino-1-(2-furanylmethyl)-3-methylpyrazole (1 mol.) and 248 g. of ethoxy methylene-benzoylacetic acid ethyl ester (1 mol.) are heated with stirring at 120° and at the same time the alcohol formed is distilled off. The temperature is maintained for one hour. The reaction product, 2-benzoyl-3-[1-(2-furanylmethyl)-3-methyl-5-pyrazolylamino]crotonic acid, ethyl ester, is crystallized with ether, yield 363 g. (96%), m.p. 82–83°.

b.     4-Hydroxy-1-(2-furanylmethyl)-3-methyl-1H- pyrazolo[3,4-b]-pyridine-5-phenylmethanone 189.5 g. of benzoyl-3-[1-(2-furanylmethyl)-3-methyl-5-pyrazolylamino]crotonic acid, ethyl ester, (0.5 mol.) are dissolved in 500 ml. of diphenylether at 240° and this temperature is maintained for two additional hours with stirring. The alcohol formed is continuously distilled off during the reaction. After the solvent is removed in vacuo, the residual of 4-hydroxy-1-(2-furanylmethyl)-3-methyl-1H-pyrazolo[3,4-b]pyridine-5-phenylmethanone crystallizes on addition of 200 ml. of methanol, yield 121 g. (72%), m.p. 130°–131° (methanol).

c. 4-Ethoxy-1-(2-furanylmethyl)-3-methyl-1H-pyrazolo-[3,4-b]pyridine-5-phenylmethanone 33.3 g. of 4-hydroxy-1-(2-furanylmethyl)-3-methyl-1H-pyrazolo[3,4-b]pyridine-5-phenylmethanone (0.1 mol.), 16.5 g. of potassium carbonate and 17 g. of ethyl iodide are heated with stirring in 100 ml. of dimethylformamide for 10 hours at 60°. The inorganic precipitate is filtered off and the solvent removed. Recrystallization of the resulting oil yields 26 g. of 4-ethoxy-1-(2-furanylmethyl)-3-methyl-1H-pyrazolo[3,4-b]pyridine-5-phenylmethanone (72%), m.p. 115°–118° (methanol).

d. 4-Amino-1-(2-furanylmethyl)-3-methyl-1H-pyrazolo[3,4-b]-pyridine-5-phenylmethanone 36.1 g. of 4-ethoxy-1-(2-furanylmethyl)-3-methyl-1H-pyrazolo[3,4-b]pyridine-5-phenylmethanone (0.1 mol.) are dissolved in 100 ml. of butyl alcohol and treated with 50 ml. of aqueous concentrated ammonia in an autoclave at 150° for 10 hours. After this time, the solvent is distilled off in vacuo and the residual 4-amino-1-(2-furanylmethyl)-3-methyl-1H-pyrazolo[3,4-b]pyridine-5-phenylmethanone if recrystallized from alcohol, yield 21.5 g. (65%), m.p. 154°–156° (ethnaol).

continuously by means of a water separator. After this time, the benzene is removed in vacuo and the residual [1-(2-furanylmethyl)-5-pyrazolyl]iminoacetoacetic acid, ethyl ester, is crystallized with ether, yield 220 g. (80%), m.p. 45–46° (methanol).

b. 2-(3-chlorobenzoyl)-3-[1-(2-furanylmethyl)-3-methyl-5-pyrazolylamino]crotonic acid, ethyl ester 275 g. of [1-(2-furanylmethyl)-5-pyrazolyl]iminoacetoacetic acid, ethyl ester, (1 mol.) are carefully added to a suspension of 30 g. of sodium hydride in 1.5 liter of anhydrous dioxane with stirring. After the addition is completed, the mixture is refluxed for one hour and then 162 g. of m-chlorobenzoyl chloride are added dropwise. Refluxing is continued for ten hours. The mixture is now carefully acidified with acetic acid and evaporated to dryness. The resulting oily residue is extracted three times with 300 ml. portions of ether. After evaporation of the solvent the residual 2-(3-chlorobenzoyl)-3-[1-(2-furanylmethyl)-3-methyl-5-pyrazolylamino]crotonic acid, ethyl ester, is crystallized with ether, yield 280 g. (68%), m.p. 99°–100°.

c. 4-hydroxy-1-(2-furanylmethyl)-6-methyl-1H-pyrazolo-[3,4-b]pyridine-5-(3-chloro)phenylmethanone 41.4 g. of (3-chlorobenzoyl)-3-[1-(2-furanylmethyl)-3-methyl-5-pyrazolylamino]crotonic acid, ethyl ester are heated for 10 minutes at 250°–255°. After this time, the oily compound is cooled to room temperature as quickly as possible. After the addition of 100 ml. of methanol, the product, 4-hydroxy-1-(2-furanylmethyl)-6-methyl-1H-pyrazolo[3,4-b]pyridine-5-(3-chloro)phenylmethanone crystallizes, yield 20 g. (54%), m.p. 238°–40° (butanol).

The following intermediates are synthesized according to procedure 2a or 3b as indicated:

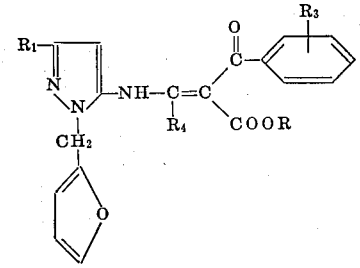

| Example | R₁ | R₃ | R₄ | M.P. | Yield, percent | Procedure |
|---|---|---|---|---|---|---|
| 4 | H | p-Cl | H | 105–108 | 83 | 2a. |
| 5 | H | p-CH₃ | H | 91–92 | 75 | 2a. |
| 6 | H | p-OCH₃ | H | 87–89 | 82 | 2a. |
| 7 | CH₃ | H | H | Oily, not further purified | | 2a. |
| 8 | H | H | ⌬ | | | 2a. |
| 9 | H | m-Cl | CH₃ | 99–100 | 68 | 3b. |
| 10 | H | H | CH₃ | Oily, not purified | | 3b. |

EXAMPLE 3

4-Hydroxy-1-(2-Furanylmethyl)-6-Methyl-1H-Pyrazolo[3,4-b]-Pyridine-5-(3-Chloro)Phenylmethanone a. [1-(2-furanylmethyl)-5-pyrazolyl]iminoacetoacetic acid, ethyl ester 163 g. of 5-amino-1-(2-furanylmethyl)pyrazole and 130 g. of acetoacetic acid ethyl ester are refluxed for ten hours in benzene. The water formed is distilled off

EXAMPLE 11

4-Chloro-1-(2-furanylmethyl)-1H-pyrazolo[3,4-b]pyridine-5-phenylmethanone 31.9 g. of 4-hydroxy-1-(2-furanylmethyl)-1H-pyrazolo[3,4-b]pyridine-5-phenylmethanone (0.1 mol.) are treated with 100 ml. of phosphorus oxychloride at 80° for 10 hours. The excess phosphorus oxychloride is removed in vacuo and the residue poured into ice water. The mixture is extracted three times with 100 ml. portions of petroleum ether. The organic layer is dried over calcium chloride, evaporated and the residual 4-chloro-1-(2-furanylmethyl)-1H-pyrazolo[3,4-b]pyridine-5-phenylmethanone is recrystallized from petroleum ether, yield 5.4 g. (16%), m.p. 78–79°.

The following additional products are synthesized by the procedure of the Example indicated by substituting the appropriately substituted reactant:

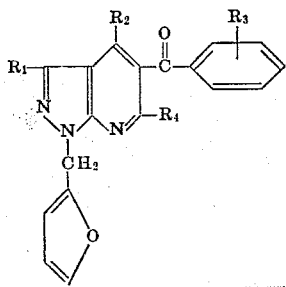

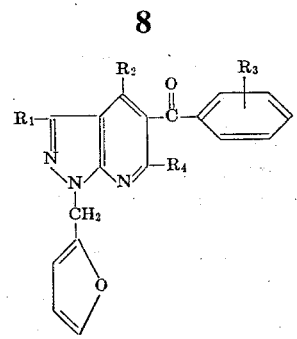

wherein $R_1$ is hydrogen or lower alkyl; $R_2$ is hydroxy, lower alkoxy, halo, amino or lower alkylamino; $R_3$ is hydrogen, halo, lower alkyl or lower alkoxy; and $R_4$ is hydrogen, lower alkyl or phenyl.

2. A compound as in claim 1 wherein $R_1$ is hydrogen or methyl; $R_2$ is hydroxy, lower alkoxy or amino; $R_3$ is hydrogen, chloro, methyl or methoxy; and $R_4$ is hydrogen, methyl or phenyl.

3. A compound as in claim 1 wherein $R_1$, $R_3$ and $R_4$ each is hydrogen.

4. A compound as in claim 1 wherein $R_2$ is hydroxy.

| Example | $R_1$ | $R_2$ | $R_3$ | $R_4$ | M.P. | Yield, percent | Procedure |
|---|---|---|---|---|---|---|---|
| 12 | H | NH$_2$ | p-Cl | H | 205–208 | 71 | 2d. |
| 13 | H | OH | p-Cl | H | 125–126 | 58 | 3c. |
| 14 | H | OC$_2$H$_5$ | p-Cl | H | 128–130 | 78 | 2c. |
| 15 | H | OC$_2$H$_5$ | p-OCH$_3$ | H | 122–124 | 75 | 2c. |
| 16 | H | OH | p-OCH$_3$ | H | 125–127 | 64 | 3c. |
| 17 | H | OH | p-CH$_3$ | H | 129–131 | 62 | 3c. |
| 18 | H | OC$_2$H$_5$ | p-CH$_3$ | H | 104–105 | 78 | 2c. |
| 19 | H | OC$_2$H$_5$ | H | phenyl | 78–79 | 65 | 1c. |
| 20 | H | OH | H | phenyl | 215–216 | 48 | 3c. |

| Example | $R_1$ | $R_2$ | $R_3$ | $R_4$ | M.P. | yield | procedure |
|---|---|---|---|---|---|---|---|
| 21 | H | OH | H | CH$_3$ | 252–254 | 61% | 3c |
| 22 | H | OC$_2$H$_5$ | H | CH$_3$ | 97–99 | 69% | 2c |
| 23 | H | O(CH$_2$)$_3$CH(CH$_3$)$_2$ | H | H | 55–56 | 58% | 2c |
| 24 | H | OC$_2$H$_5$ | m-Cl | CH$_3$ | 100–101 | 72% | 2c |
| 25 | H | NHC$_2$H$_5$ | H | H | 135–137 | 81% | 2d |
| 26 | H | NH$_2$ | H | H | 182–184 | 77% | 2d |
| 27 | CH$_3$ | NHCH(CH$_3$)-C$_2$H$_5$ | H | H | 70–72 | 79% | 2d |

| Example | $R_1$ | $R_2$ | $R_3$ | $R_4$ | Procedure |
|---|---|---|---|---|---|
| 28 | C$_3$H$_7$ | OH | p-CH$_3$ | H | 2b. |
| 29 | C$_2$H$_5$ | OC$_2$H$_5$ | H | CH$_3$ | 2c. |
| 30 | H | OH | H | C$_3$H$_7$ | 3c. |
| 31 | H | OC$_2$H$_5$ | o-Br | H | 2c. |
| 32 | CH$_3$ | NH$_2$ | p-CH$_3$ | phenyl | 2d. |
| 33 | H | OH | m-OCH$_3$ | CH$_3$ | 3c. |
| 34 | H | OC$_2$H$_5$ | p-OC$_3$H$_7$ | H | 2c. |
| 35 | C$_4$H$_9$ | Cl | H | H | 11. |
| 36 | CH$_3$ | OH | o-CH$_3$ | CH$_3$ | 3c. |
| 37 | H | OC$_2$H$_5$ | m-CH$_3$ | H | 2c. |
| 38 | H | OH | m-CH$_3$ | H | 3c. |
| 39 | CH$_3$ | NHC$_2$H$_5$ | p-CH$_3$ | CH$_3$ | 2d. |
| 40 | H | NHC$_2$H$_5$ | p-OCH$_3$ | H | 2d. |
| 41 | H | NHC$_2$H$_5$ | H | phenyl | 2d. |
| 42 | H | Cl | H | Same | 11. |

What is claimed is:

1. A compound of the formula

5. A compound as in claim 1 wherein $R_2$ is lower alkoxy.

6. A compound as in claim 1 wherein $R_2$ is amino.

7. A compound as in claim 1 wherein $R_2$ is lower alkylamino.

8. A compound as in claim 1 wherein $R_1$, $R_3$ and $R_4$ each is hydrogen and $R_2$ is hydroxy.

9. A compound as in claim 1 wherein $R_1$ is lower alkyl, $R_2$ is amino and $R_3$ and $R_4$ is hydrogen.

10. A compound as in claim 9 wherein the lower alkyl group is methyl.

11. A compound as in claim 1 wherein $R_1$ is methyl, $R_2$ is hydroxy, $R_3$ is chloro and $R_4$ is hydrogen.

12. A compound as in claim 1 wherein $R_2$ is chloro, and $R_1$, $R_3$ and $R_4$ each is hydrogen.

13. A compound as in claim 1 wherein $R_1$ and $R_4$ each is hydrogen, $R_2$ is hydroxy and $R_3$ is methyl.

14. A compound as in claim 1 wherein $R_1$ and $R_3$ each is hydrogen, $R_2$ is hydroxy and $R_4$ is phenyl.

* * * * *